M. P. HOLMES.
REVERSIBLE FRICTION TRUCK DRIVE.
APPLICATION FILED DEC. 10, 1917.
1,435,903.   Patented Nov. 14, 1922.
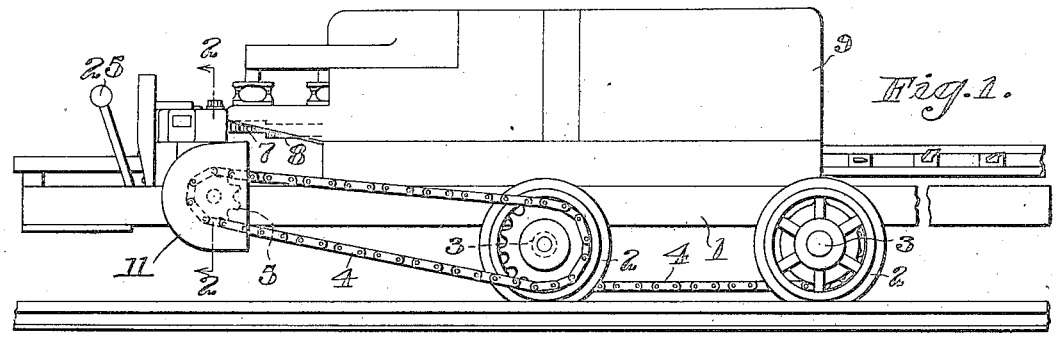
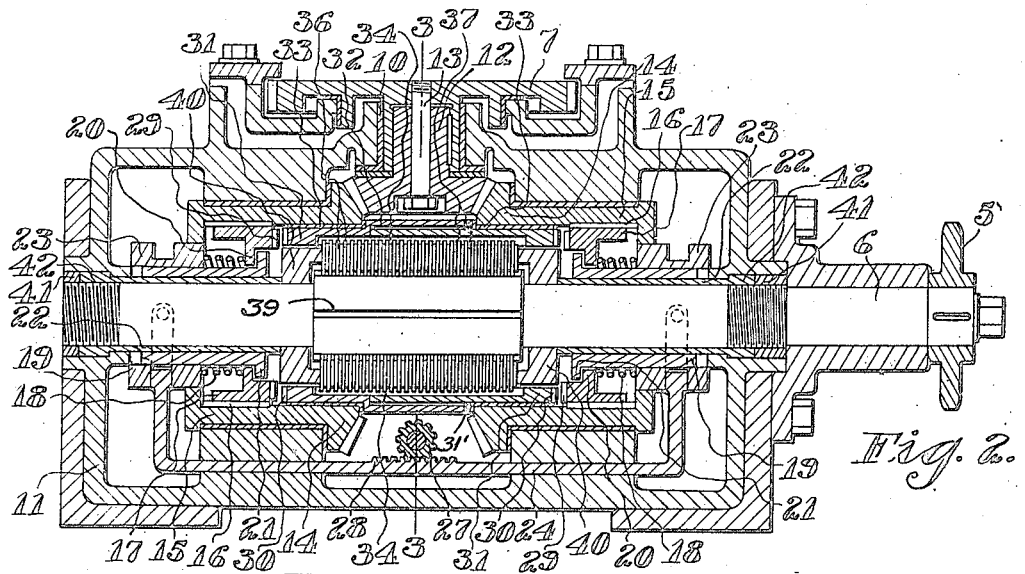
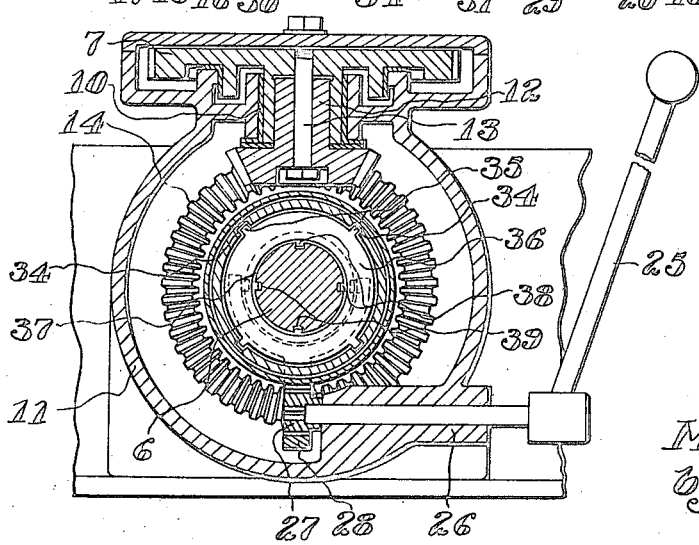
Inventor:
Morris P. Holmes Patented Nov. 14, 1922.

1,435,903

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

REVERSIBLE FRICTION TRUCK DRIVE.

Application filed December 10, 1917. Serial No. 206,457.

*To all whom it may concern:*

Be it known that I, MORRIS P. HOLMES, a citizen of the United States, residing at Claremont, in the county of Sullivan and State of New Hampshire, have invented certain new and useful Improvements in Reversible Friction Truck Drives, of which the following is a full, clear, and exact specification.

My invention relates to trucks.

It has for its object to provide an improved truck driving mechanism especially adapted to use in connection with mining machines. A further object of my invention is to provide an improved truck driving mechanism of the friction type in which the necessary area of the friction surface is materially reduced at the same time that all unnecessary wear upon the same is eliminated. A more specific object of my invention is to provide an improved truck driving mechanism wherein, through the utilization of but a single friction clutch and suitable cooperating mechanism therefor, that clutch is adapted to control the entire driving or braking of the truck. These and other objects of my improvement will, however, hereinafter more fully appear.

In the accompanying drawings, I have shown for purposes of illustration one embodiment which my invention may assume in practice.

In these drawings,—

Fig. 1 is a side elevation of a mining machine truck equipped with my improvement, a mining machine being shown in loaded position thereon.

Fig. 2 is a longitudinal sectional view of the truck driving mechanism taken substantially on line 2—2 of Fig. 1.

Fig. 3 is a transverse sectional view of the same taken on line 3—3 of Fig. 2.

In this illustrative construction, I have disclosed a truck frame 1 mounted upon the usual truck wheels 2 which are in turn carried on the usual axles 3 and driven through driving mechanism including chain and sprocket connections 4 from a sprocket 5 operatively connected to a truck driving shaft 6 disposed transversely at the rear end of the frame and adapted to be driven from a gear 7 engageable with or disengageable from a moving element 8 on a mining machine 9 as the latter is slid along the frame into or out of loaded position.

In my improved construction, it will be observed that the gear 7 is journaled in suitable bearings 10 on a casting 11 disposed at the rear of the frame and preferably having apertures in its opposite ends in which the transverse shaft 6 is journaled. As shown, this gear 7 is fixed to a lower cooperating beveled gear 12 by means of a suitable bolt 13, and this gear 12 constantly meshes with a pair of oppositely disposed beveled gears 14 having elongated sleeves 15 thereon disposed concentrically with the shaft 6 and enclosing the latter. These sleeves 15 are in turn each keyed at 16 on their inner peripheries to a reciprocable clutch member 17, these clutch members being disposed concentrically around the shaft and within the sleeves 15. In a preferred form, these clutch members 17 are spaced apart as shown and normally projected towards each other by means of coiled springs 18 each disposed around one of a pair of longitudinally reciprocable sleeves 19 carried on the shaft 6 and acting against an internal flange 20 on its member 17 and an abutment, hereinafter described, on the shaft 6. As shown, each of these sleeves 19 is in turn provided with a flange 21 on its front end adapted to engage with the adjacent internal flange 20 on the members 17 and thus move the latter in their keyways and relative to the sleeves 15 with which the members 17 constantly rotate. As shown, a bearing sleeve 22 is also provided between each of the reciprocating sleeves 19 and the shaft 6, and each of these sleeves 19 also carries at its outer end and fixedly secured thereto a clutch shipper 23 which not only forms an abutment for the outer end of the adjacent spring 18, but also acts as a clutch shipping element adapted to be operated in a usual manner. In the form of my invention illustrated herein, it will be noted that a reciprocable clutch controlling member 24 is connected to each of these shippers 23, in such a manner as to enable them to be operated alternately as said member is moved in opposite directions, by an upstanding clutch controlling lever 25 rotatable in its bearing 26 to rotate a pinion 27 meshing with a rack 28 formed on the member 24.

As shown, each of the clutch members 17 is preferably, though not necessarily, provided with teeth 29 on its inner end adapted to engage with cooperating teeth 30 formed on the opposite ends of a sleeve member 31. As shown, this sleeve member may be of two-part construction in order to facilitate assembly of the friction clutch (hereinafter described) housed therein, the two elements thereof being suitably rigidly connected and one of the same, if desired, being provided with an overlapping flange 32 adapted to form a bearing between the two beveled gears 14. As shown, suitable bearings 33 may also be provided between these sleeves and the sleeves 15 on opposite sides of the flange 32. In the preferred construction, a flange 31' is provided on the right hand sleeve 31 (Fig. 2) between members 32 and 33 to hold this member 31 against longitudinal displacement. As illustrated, these sleeves 31 are also provided on their inner peripheries with a plurality of keyways 34 adapted to receive suitable projections 35 on the peripheries of a series of parallel friction discs 36 and thus transmit rotation to these discs. It will also be observed that disposed between the discs 36 in a well known manner are a plurality of parallel discs 37 having suitable projections 38 thereon received in suitable keyways 39 on the shaft 6. As is usual in such clutches, means are provided for shifting certain of the discs laterally to a sufficient degree to compress the adjacent discs. As shown herein, these means assume the form of a plurality of abutment members 40 freely rotatable on the shaft 6 and preferably disposed just within the outer ends of the sleeves 31 and abutting against the inner ends of the bearing sleeves 22. As shown, these abutment members 40 are also here in readily adjustable to take up wear between the discs by simply longitudinally adjusting the sleeves 22 through the removal of lock nuts 41 and longitudinal adjustment of adjusting nuts 42 threaded on the shaft.

In the operation of my improved construction, it will be observed that when the power of the mining machine is transmitted from the moving part 8 thereof to the gear 7, the rotation of the latter is transmitted to the beveled gear 12 in such a manner as constantly to rotate the two cooperating beveled gears 14 in opposite directions. However, if the clutch controlling member 25 is in its central or neutral position, the parts will, despite this rotation, continue to assume the position shown in Fig. 2 and no rotation will be imparted to the shaft 6. Should, however, the lever 25 be turned to the right or left, one or the other of the clutch members 17 will be reciprocated toward the cooperating clutch member. For instance, let us assume that the controlling lever 25 is so moved as to cause the pinion 27 to rotate to the right and the member 24 to reciprocate to the left. When this occurs, the right hand clutch shipping member 23 thereupon will move to the left to compress the spring 18 and slide the rotating clutch member 17 to the left in its spline 16. If the teeth 29 on the member 17 are then free to mesh with the teeth 30 on the sleeve 31, the rotation of the gear 14 will thus instantly be imparted through the clutch member 17 to the sleeve 31 in such a manner as to cause the same to rotate relative to the shaft and carry with it its friction discs 36. If the teeth 29 do not come exactly into mesh, however, it will be observed that the rotating member 17 will be placed under the pressure of the spring 18 in such a manner as to enable the teeth 29 of the rotating member 17 to snap quickly into place as the member 17 is rotated. It will also be observed that after the teeth 29 on this member 17 have been brought into mesh with their cooperating teeth 30 on the sleeve 31, the sleeve 19, which has moved to the left with the clutch shipper 23, is brought into engagement with the abutment member 40 in such a manner as to force the latter to the left and thereby compress the friction discs 36 and 37 and thus transmit the rotation of the member 31 to the shaft 6. With the parts in this relation, obviously, if desired, by a reverse operation of the member 25, the left hand clutch member 17 may be thrown into operation, and, prior to the connection of the latter with the left hand end of the sleeve 31, the right hand clutch member 17 will be disconnected from the right hand end of that member, one spring 18 being compressed as the other returns its parts to their operative position. It will thus be evident that by operating the lever 25, the direction of movement of the truck may also be controlled in a well known manner through such a reversal and the consequent application of the friction as a braking element.

In the use of my improved construction, wherein only a single friction is used, it will be observed that it is practically impossible for the friction to be loaded until a clutch 17 has been connected. Attention is also directed to the fact that through the provision of the spring pressed members 17 and their cooperating mechanism, the connection of these members is assured if there is any slip at all between the teeth 29 and the teeth 30, the pressure exerted by the springs being such as to cause the teeth 29 to snap into mesh as the members 17 are rotated. Moreover, in the event that there is no slip between the clutch teeth 29 and 30, it will also be observed that due to my improved construction it is still possible for the friction to be made available either as a driving or braking element, as the pressure which may be brought to bear upon the teeth 30 by the teeth 29 is sufficient to cause the former to rotate with the latter. It will also be observed that during the operation of releasing any given clutch member 17, the same is disconnected from the adjacent end of the toothed central sleeve 31 after the pressure of the flange 21 against the abutment member 40 has been released, the friction thus being released as the first step in the process of disconnection. Attention is also directed to the fact that due to the action of the flange 21, the member 17 is positively withdrawn from engagement with its cooperating teeth so that sticking of the same is effectually prevented, the latter thus normally being thrown into mesh with their cooperating teeth under spring pressure and always positively withdrawn. It will also be particularly noted that in my improved single friction construction it is possible without in any way interfering with the results obtainable, to eliminate all necessity for the provision of an additional friction such as has heretofore been necessary, and at the same time to eliminate wear upon a part of the friction surface, no part of the same in my improved construction, dragging and therefore wearing out while another part is operating, as is the case in a double friction construction. These and other advantages of my improved construction will, however, be clearly apparent to those skilled in the art.

While I have in this application specifically described one embodiment which my invention may assume in practice, it will be understood that this form is used for purposes of illustration, and that the invention may be modified and embodied in various other forms without departing from its spirit or the scope of the appended claims.

What I claim as new and desire to secure by Letters Patent is:

1. In a truck, truck driving mechanism including a friction clutch and a plurality of other clutches, each of said last mentioned clutches comprising a member operative upon movement to effect frictional engagement of the elements of said friction clutch and operative engagement of its own constituent clutch elements.

2. In a truck, truck driving mechanism including a friction clutch, a plurality of clutches each comprising a member operative to control the connection of said friction clutch and the operative engagement of its own clutch elements, and means for alternately actuating said members to effect said control.

3. In a truck, truck driving mechanism including a friction clutch and controlling means therefor including a plurality of clutches each comprising a member alternately movable to connect with one of the elements of said friction clutch.

4. In a truck, truck driving mechanism including a truck driving shaft and driving means therefor including a plurality of clutches coaxial therewith and having elements operative when engaged to make connections for the driving of said shaft in opposite directions, and a friction clutch having elements which are operatively connected to an element of each of said first mentioned clutches.

5. In a truck, truck driving mechanism including a friction clutch, and means for controlling the direction of rotation and the operation thereof including a plurality of alternately operative clutches each comprising a member operative upon movement to effect rotation of said truck driving mechanism in one direction.

6. In a truck, truck driving mechanism including a friction clutch, and means for controlling the loading of said clutch, said means including a plurality of cooperating clutches each comprising means movable to connect with said friction clutch.

7. In a truck, truck driving mechanism including a friction clutch, means for controlling the loading of said clutch including a plurality of cooperating clutches comprising members movable to connect with said friction clutch, and means for alternately actuating said members.

8. In a truck, truck driving mechanism including a friction clutch, a plurality of controlling clutches therefor each comprising a member movable to connect with said friction clutch, and a single means for controlling each of said controlling clutches and said friction clutch.

9. In a truck, truck driving mechanism including a friction clutch, a plurality of controlling clutches therefor having members movable to connect therewith, and a single means for loading said friction clutch and alternately actuating said other clutches.

10. In a truck, a truck driving member, driving mechanism therefor including a friction clutch and a plurality of clutches having members controlling the connection thereof, and means for insuring the connection of one of said clutches prior to the loading of said friction clutch.

11. In a truck, truck driving mechanism including a single reversible friction clutch, and mechanism for controlling the direction of rotation thereof including a plurality of clutches having members alternately connectable with one of the elements thereof.

12. In a truck, truck driving mechanism including a single friction clutch, a plurality of clutches each including a reciprocable member operative to control said friction clutch, and means whereby reciprocation of one of said members operates to connect one of said controlling clutches and subsequently load said friction clutch.

13. In a truck, truck driving mechanism including a driven shaft, a sleeve, a friction clutch therebetween, a plurality of cooperating clutches having members connectable with said friction clutch, through said sleeve, and means for connecting one of said clutch members and loading said friction clutch and for delaying the loading of said friction clutch until said clutch member is engaged.

14. In a truck, truck driving mechanism including a driven shaft, a sleeve having spaced clutch elements, a friction clutch therebetween, a plurality of cooperating clutches having members connectable with said friction clutch, and means for connecting one of said clutch members and loading said friction clutch and for delaying the loading of said friction clutch until said clutch member is engaged.

15. In a truck, truck driving mechanism including a driven shaft, a sleeve, a friction clutch therebetween, a plurality of cooperating clutches having members connectable with said friction clutch through said sleeve, and a single means for connecting one of said clutch members and loading said friction clutch and for delaying the loading of said friction clutch until said clutch member is engaged.

16. In a truck, truck driving mechanism including a friction clutch, a double ended clutch member having spaced clutch elements rotatable therewith, cooperating clutch members movable to engage with said elements, and means for controlling the connection of said clutch members.

17. In a truck, truck driving mechanism including a single friction clutch, a plurality of controlling clutch members therefor alternately connectable therewith, means for rotating each of said clutch members, and a single controlling means for one of said members and said friction clutch.

18. In a truck, truck driving mechanism including a single friction clutch, a plurality of controlling clutch members therefor alternately connnectable therewith, means for rotating each of said clutch members, and a single controlling means for either of said members and said friction clutch.

19. In a truck, truck driving mechanism including a friction clutch, a plurality of clutches having members operatively connected with said friction clutch and each also including a constantly rotatable spring pressed clutch member, and means for actuating one of said last mentioned members to engage one of said clutches and for subsequently loading said friction clutch.

20. In a truck, truck driving mechanism including a friction clutch, a plurality of clutches including members operatively connected with said friction clutch and each also including a constantly rotatable spring pressed clutch member, and a single means for engaging either of said clutches and subsequently loading said friction clutch.

21. In a truck, truck driving mechanism including a friction clutch and a plurality of cooperating clutch machanisms including spaced clutch elements operatively connected therewith and spring pressed movable clutch elements operatively connectable with said spaced elements, and oppositely movable means adapted to alternately engage said clutch mechanisms and said friction clutch.

22. In a truck, truck driving mechanism including a driven shaft, a friction clutch having one element connected to said shaft, said clutch being normally disengaged, reversely rotating driving elements, a plurality of clutch mechanisms controlling the connection of said driving elements to the other element of said friction clutch, and means for controlling said friction clutch and said clutch mechanisms.

23. In a truck driving mechanism, a driven shaft, a friction clutch having one element rotatable with said shaft and its other element provided with clutch teeth at its ends, constantly rotatable reciprocable spring pressed clutch elements engageable with the teeth of said other element, and means for reciprocating said clutch elements in opposite directions and for controlling said friction clutch.

In testimony whereof I affix my signature.

MORRIS P. HOLMES.